(12) United States Patent
Kunkel

(10) Patent No.: US 12,397,721 B2
(45) Date of Patent: Aug. 26, 2025

(54) TRUCK-MOUNTED DUAL-PURPOSE STORAGE ASSEMBLY

(71) Applicant: Patrick James Kunkel, Lester Prairie, MN (US)

(72) Inventor: Patrick James Kunkel, Lester Prairie, MN (US)

( * ) Notice: Subject to any disclaimer, the term of this patent is extended or adjusted under 35 U.S.C. 154(b) by 280 days.

(21) Appl. No.: 18/319,926

(22) Filed: May 18, 2023

(65) Prior Publication Data

US 2023/0382311 A1 Nov. 30, 2023

Related U.S. Application Data

(60) Provisional application No. 63/345,250, filed on May 24, 2022.

(51) Int. Cl.
| | |
|---|---|
| *B60R 9/06* | (2006.01) |
| *B60R 11/06* | (2006.01) |
| *B62D 33/02* | (2006.01) |

(52) U.S. Cl.
CPC ............... *B60R 9/06* (2013.01); *B60R 11/06* (2013.01); *B62D 33/0207* (2013.01)

(58) Field of Classification Search
CPC ......... B60R 11/06; B60R 9/00; B60R 9/0695; B60R 2021/0083; B60R 2011/004; B60R 7/02
USPC .................................. 224/404, 403; 296/37.6
See application file for complete search history.

(56) References Cited

U.S. PATENT DOCUMENTS

| | | | | |
|---|---|---|---|---|
| 5,258,893 A | * | 11/1993 | Finneyfrock | B60Q 1/30 362/369 |
| 5,988,473 A | * | 11/1999 | Hagan | B60R 9/00 312/328 |
| 8,038,195 B1 | * | 10/2011 | Hutcheson | B60R 9/00 296/136.04 |
| 9,499,106 B2 | * | 11/2016 | Reed, III | B60R 11/06 |
| 10,000,165 B2 | | 6/2018 | Reed, III | |
| 10,328,863 B2 | * | 6/2019 | Spahn | B60R 9/06 |
| 10,513,229 B2 | * | 12/2019 | Wilson | B60P 3/04 |
| 11,001,205 B2 | | 5/2021 | Reed, III | |

(Continued)

OTHER PUBLICATIONS https://toolrig.com, retrieved on Jan. 20, 2023, 6 pages.

*Primary Examiner* — Corey N Skurdal
(74) *Attorney, Agent, or Firm* — Kelly, Holt & Christenson; Joseph R. Kelly

(57) ABSTRACT

A pickup truck includes a cab having a rear window and a bed including a bed floor and a first and second side rail. A dual-purpose storage assembly includes a frame assembly that extends across a width of the bed and is mounted to the tops of the first and second side rails. The storage assembly further includes a first and second storage cabinet each extending across a respective portion of the rear window and comprising a respective frame coupled to the main frame, a respective storage volume, and a respective moveable member moveable between a closed and opened position to cover and uncover the corresponding storage volume. The assembly further includes a cross-member section that extends across a respective portion of the rear window and comprises one or more cross-members, each cross-member extending along a dimension of the cross-member section and extending across a respective portion of the window.

20 Claims, 6 Drawing Sheets

(56) References Cited

U.S. PATENT DOCUMENTS

| | | | |
|---|---|---|---|
| 2013/0181023 A1* | 7/2013 | Shawanda | B66D 1/00 224/403 |
| 2020/0223349 A1* | 7/2020 | Zanca | B60P 3/20 |
| 2021/0086702 A1* | 3/2021 | Christensen | B60R 3/02 |

* cited by examiner

TRUCK-MOUNTED DUAL-PURPOSE STORAGE ASSEMBLY

CROSS-REFERENCE TO RELATED APPLICATION

The present application is based on and claims the benefit of U.S. provisional patent application Ser. No. 63/345,250 filed May 24, 2022 the content of which is hereby incorporated by reference in its entirety.

FIELD OF THE DESCRIPTION

The present description relates to the automotive industry. More specifically, the present description relates to an automotive accessory in the form of an assembly that is mountable to the bed of truck, the assembly providing storage, such as for tools and other items, as well as protection for the rear window of the truck.

BACKGROUND

There are a wide variety of different automotive vehicles. One such automotive vehicle is a truck, or pickup truck. A pickup truck includes a bed disposed behind the driver/passenger cab (hereinafter cab). The bed includes a bed floor and two side rails that are separated by the width of the bed floor. The two side rails are of a height and each include a top. The height of the side rails and width of the bed floor, in part, define a bed volume. Traditionally, a rear window of the cab is above and provides a view of the bed (as well as a view rearward of the pickup truck). In some examples, the rear window, or a portion thereof, may be openable (e.g., slidably openable) to provide access from the driver/passenger cab to the bed, and vice versa.

The bed is useable to store and carry a variety of objects. One such object is a storage box. Storage boxes are useable to securably (by way of closing and locking of the storage box) hold a variety of objects, such as tools. Traditionally, such storage boxes are placed within and take up a portion of the bed volume. Another accessory is a protective rack assembly, sometimes referred to as a headache rack. A headache rack is mountable to the side rails of the bed and includes a frame assembly and cross-member(s) (e.g., panel(s), bar(s), screen(s), etc.) The cross-member(s) are typically supported by and extend between the frame assembly. The headache rack is mounted such that the cross-member(s) cover at least a portion of the rear window and prevent objects, such as objects being carried in the bed, from contacting and breaking through the rear window.

The discussion above is merely provided for general background information and is not intended to be used as an aid in determining the scope of the claimed subject matter.

SUMMARY

A pickup truck includes a cab having a rear window and a bed including a bed floor and a first and second side rail. A dual-purpose storage assembly includes a frame assembly that extends across a width of the bed and is mounted to the tops of the first and second side rails. The storage assembly further includes a first and second storage cabinet each extending across a respective portion of the rear window and comprising a respective frame coupled to the main frame, a respective storage volume, and a respective moveably member moveable between a closed and opened position to cover and uncover the corresponding storage volume. The assembly further includes a cross-member section that extends across a respective portion of the rear window and comprises one or more cross-members, each cross-member extending along a dimension of the cross-member section and extending across a respective portion of the window.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
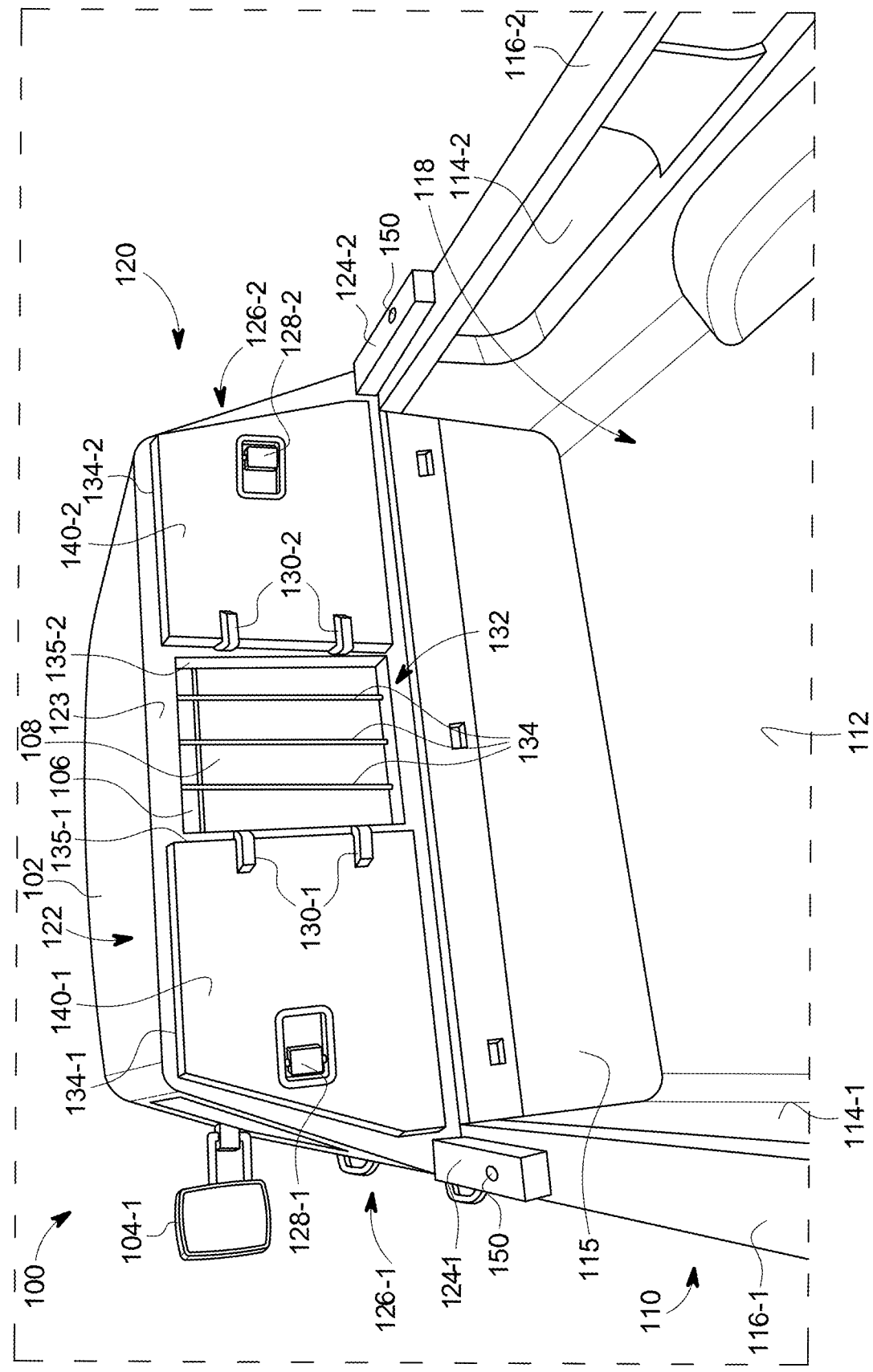
FIG. 1 is a perspective view of a pickup truck including an example dual-purpose storage assembly.
Figure 2:
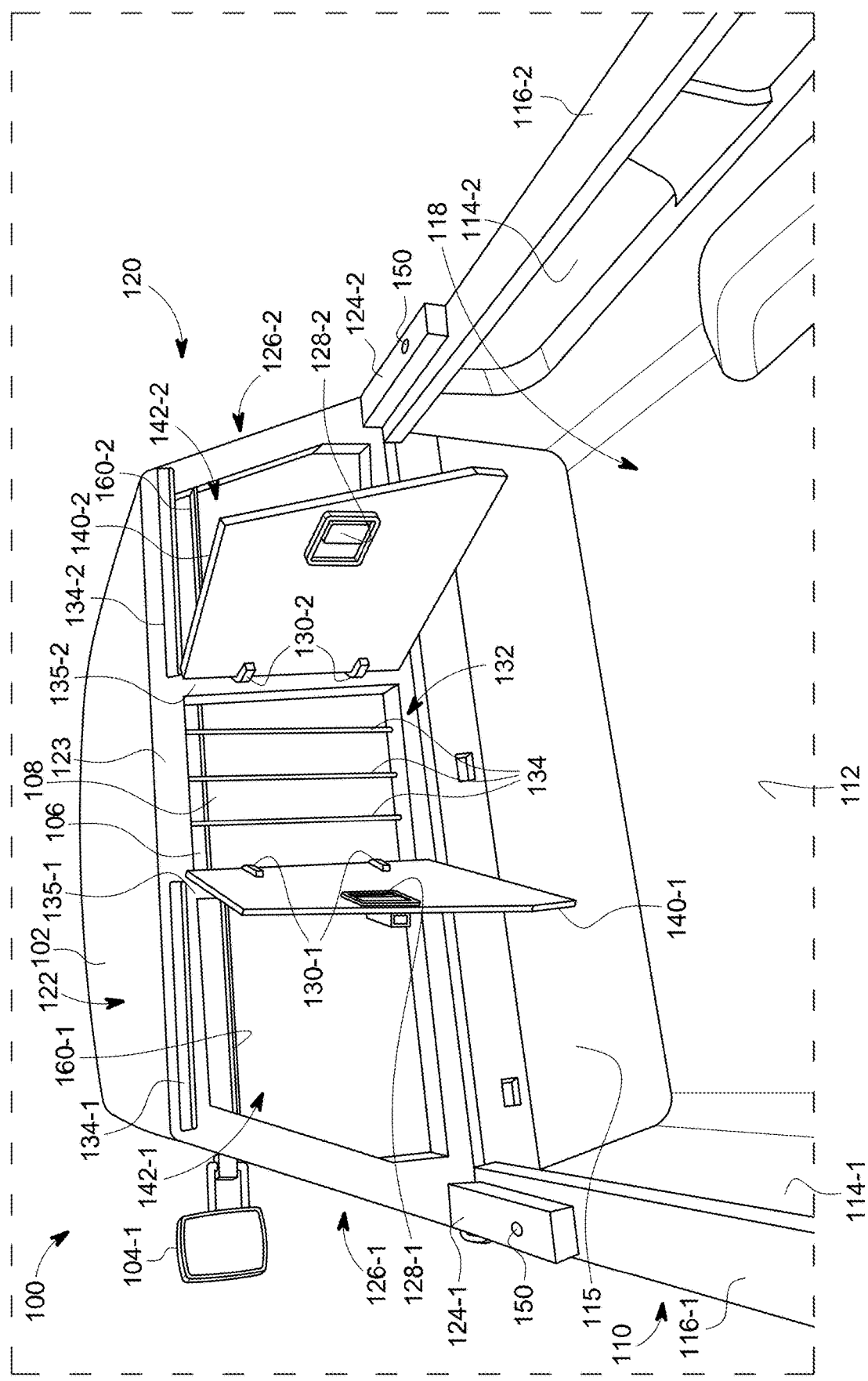
FIG. 2 is a perspective view of a pickup truck including an example dual-purpose storage assembly.
Figure 3:
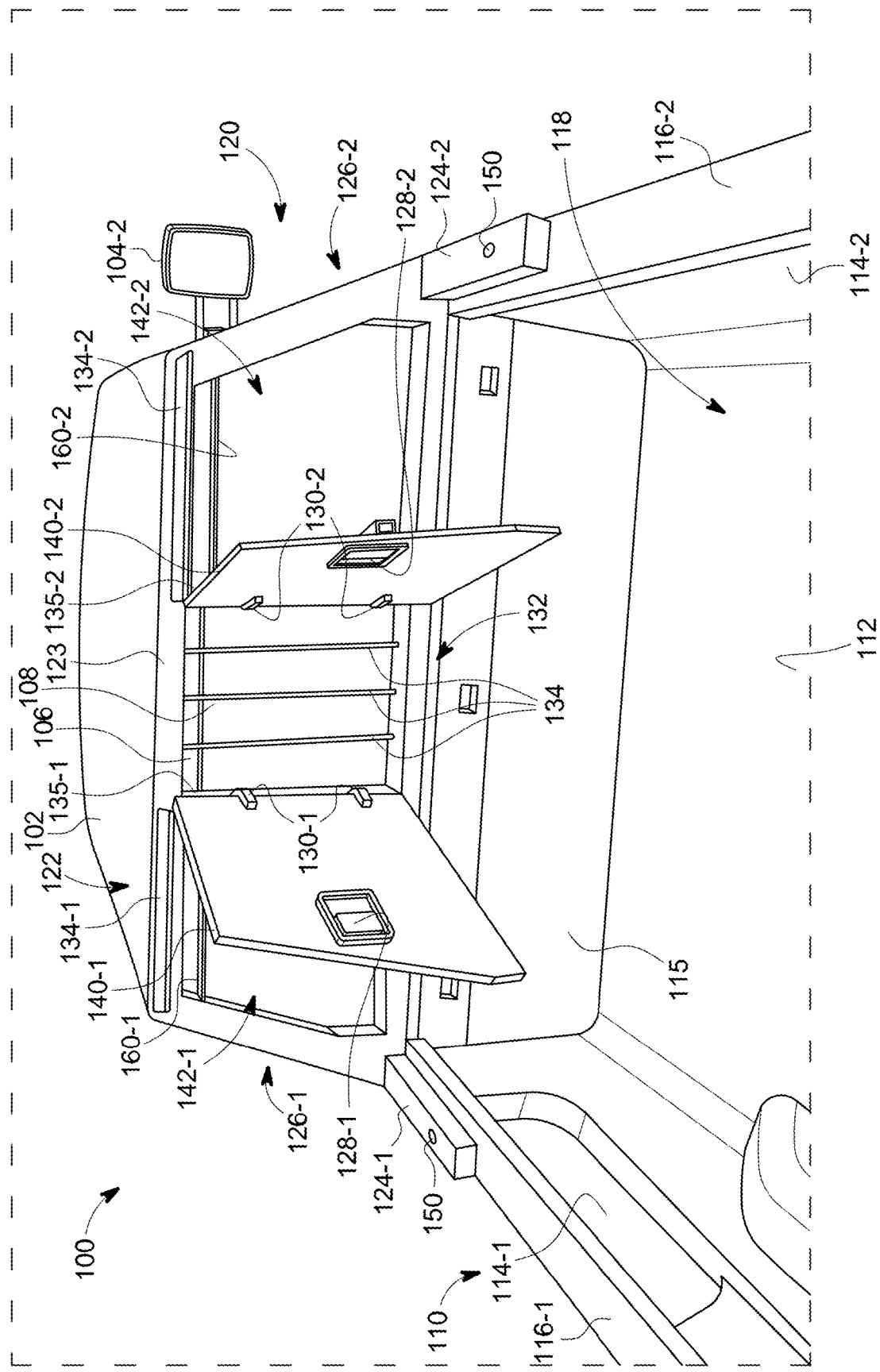
FIG. 3 is a perspective view of a pickup truck including an example dual-purpose storage assembly.
Figure 4:
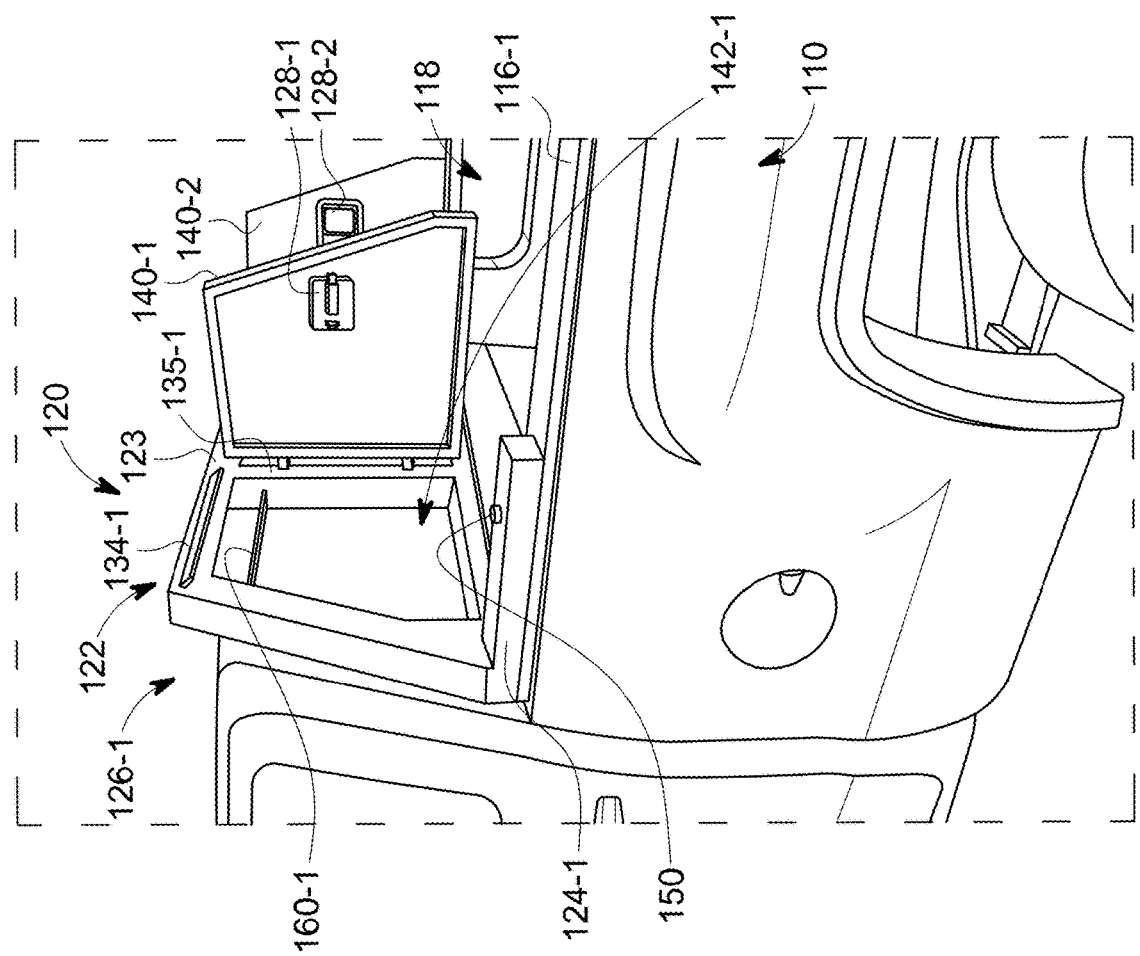
FIG. 4 is a perspective view of a pickup truck including an example dual-purpose storage assembly.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

As discussed above, storage boxes (e.g., toolboxes) have been used as an accessory with pickup trucks. Typically, these storage boxes are at least partially placed within the volume of the bed of the pickup truck and thus, take up a portion of the bed volume. Additionally, some of these storage boxes are also within an air space corresponding to the bed volume and thus, also take up a portion of the air space corresponding to the bed volume. Pickup truck beds have been shrinking in length, due in part to the rise of extended (or full cabs). Trucks can be had with a full cab and an extended bed that provides additional bed length, but this option increases the overall length of the truck and adds additional expense to the purchaser. Even in pickup truck configurations with a longer bed, all of the bed space may be needed. Where bed space is not sufficient, the user of the pickup truck may have to store additional items within the cab, thus reducing the passenger space, use a trailer, increasing the wear and load on the pickup truck, or allow a portion of each of one or more items stick out the bed and outside of the perimeter of the pickup truck and outside of the air space corresponding to the pickup truck, which potentially puts the objects in the pathway of other objects or on a pathway in which they may collide with other objects. Additionally, typical storage boxes do not provide much, if anything, in the way of rear window protection.

As discussed above headache racks have been used to provide rear window protection. However, these typical headache racks do not provide for secure storage of objects (e.g., stored in a closed space that is lockable). Additionally, some of the headache racks may be disposed within the bed volume or the air space corresponding to the bed volume, or both.

Described herein are example dual-storage storage assemblies having the dual-purposes of providing secure storage and providing rear window protection, thus fulfilling the role of both the typical storage box and the typical headache rack. The example dual-purpose storage assemblies described herein are disposed entirely without the bed volume and are, at least when in a closed state, disposed entirely without the air space corresponding to the bed volume.

FIGS. 1-4 are perspective views showing a pickup truck 100 including one example of a dual-purpose storage assembly 120. FIGS. 1-4 will be described simultaneously. Pickup truck 100 includes a cab 102, side mirrors 104 (shown as 104-1 and 104-2), a rear light assembly 106, a rear window 108, a bed 110, and a dual-purpose storage assembly 120. Bed 110 includes a bed floor 112, two side rails 114 (shown as 114-1 and 114-2), and a front rail 115. Bed 110 can also include a tail gate (not shown) that is movably coupled to bed 110. Each side rail 114 includes a top 116 (shown as 116-1 and 116-2). As can be seen in FIGS. 1-4, the width of the bed floor 112 and the height of the side rails 114 (along with the length of the bed floor 112 (e.g., distance between the front rail 115 and the tail gate)) define a bed volume 118.

As further illustrated in FIG. 1-4, dual-purpose storage assembly 120 is coupled to pickup truck 100 such that dual-purpose storage assembly 120 is wholly outside of, and thus, does not take up space of bed volume 118. Additionally, as can be seen (most clearly in FIG. 1) dual-purpose storage assembly 120, when in the closed state (shown in FIG. 1) does not take up air space corresponding to the bed volume 118. The air space corresponding to bed volume 118 is the space in the air (or atmosphere) in an imaginary column extending from the upper perimeter of bed volume 118 to, theoretically infinity, but at least to the end of the atmosphere. The imaginary column corresponds to the shape of the bed volume 118 and is of the same length and width as the bed volume 118 and is of the same orientation as the bed volume 118 (that is, as the bed volume 118 changes orientation so too does the orientation of the imaginary column). Thus, dual-purpose storage assembly 120, when in the closed state (shown in FIG. 1) is not within the imaginary column that is the air space corresponding to the bed volume 118.

Dual-purpose storage assembly 120 includes frame assembly 122, rain guards 134 (illustratively shown as 134-1 and 134-2), storage cabinets (or storage cabinet assemblies) 126 (illustratively shown as 126-1 and 126-2), and cross-member section 132. Frame assembly 122, itself, includes main frame structure 123 and feet 124 (illustratively shown as 124-1 and 124-2). Storage cabinets 126 each include a frame structure 135 (illustratively shown as 135-1 and 135-2), a door 140 (illustratively shown as 140-1 and 140-2), a lockable door handle assembly 128 (illustratively shown as 128-1 and 128-2), moveable coupling mechanisms 130 (illustratively shown as 130-1 and 130-2), a storage volume 142 (illustratively shown as 142-1 and 142-2), and one or more storage accessories 160 (illustratively shown as 160-1 and 160-2). Cross-member section 132, itself, includes one or more cross-members 134.

Each foot 124 mounts on a corresponding side-rail top 116 and includes one or more apertures that are configured to receive a fastening mechanism 150 (illustratively shown as a bolt assembly including a bolt and a nut). A bolt of each fastening mechanism 150 extends through a corresponding aperture of a corresponding foot 124 and through a corresponding aperture of a corresponding side rail 114 that is aligned with the corresponding aperture of the corresponding foot 124. A nut (not shown) may be secured to a threaded end of each bolt to fastenably and removeably couple dual-purpose storage assembly 120 to pickup truck 100. Other forms of fastening mechanisms are contemplated herein.

Each frame structure 135 of each storage cabinet 126 is coupled to main frame structure 123. Each door 140 is moveably coupled to frame structure 135, by way of one or more respective moveable coupling mechanisms 130 (illustratively shown as hinges). Each door 140 is thus swingably openable and closeable to reveal or cover a respective storage volume 142. Storage volume 142 provides for storage of various objects, such as tools. Each storage cabinet 126 can include one or more storage accessories 160 that provide surfaces upon which object(s) (or portion(s) thereof) can rest to be stored. Storage accessories 160 thus provide for organization and can assist in keeping objects in place while stored, particularly as the storage cabinets 126 are moved, such as during travel of the pickup truck 100. In the illustrated example, storage accessories 160 are shown as rods from which objects can be hung, however, in other examples, storage cabinets can include, alternatively, or additionally, other types of storage accessories such as hook, shelves, baskets, etc. Additionally, while in the illustrated example it is shown that each storage cabinet 126 only includes one storage accessory 160, it will be understood that in other examples each storage cabinet 126 can include a plurality of storage accessories 160, which could comprise a plurality of the same type of storage accessories 160 or a plurality of storage accessories 160 of two or more types.

Each lockable door handle assembly 128 provides for fastenable and lockable closing of its corresponding door 140 to provide security of objects within the corresponding storage volume 142. Additionally, it can be seen in FIGS. 1-4 that each storage volume 142 is disposed entirely without the air space corresponding to the side rail 114 that it is most proximate to. That is, storage volume 142-1 is disposed entirely outside of the air space corresponding to side rail 114-1 and storage volume 142-2 is disposed entirely outside of the air space corresponding to side rail 114-2. As with the air space corresponding to bed volume 118, the air space corresponding to each side rail 114 is the space in the air (or atmosphere) in an imaginary column extending from the upper perimeter of the side rail (e.g., the respective side rail top 116) to, theoretically infinity, but at least to the end of the atmosphere. Each imaginary column corresponds to the shape of the respective side rail 114 and is of the same length and width as the corresponding side rail 114, and is of the same orientation as the corresponding side rail (that is, as the corresponding side rail 114 changes orientation so too does the orientation of the corresponding imaginary column). Thus, storage volume 142-1 is not within the imaginary column that is the air space corresponding to side rail 114-1 and storage volume 142-2 is not within the imaginary column that is the air space corresponding to side rail 114-2.

Because of the arrangement of dual-purpose storage assembly 120 (e.g., the way in which doors 140 are opened over the bed floor 112 and the alignment of storage volumes 142 in between the side rail air spaces) shown in FIGS. 1-4, the objects will tend to fall into bed 110 rather than outside of the truck 100, such as on the ground or the road. As can be seen in FIGS. 1-4, each door 140 is swingably openable towards an interior of bed 110 such that each door 140 extends over bed 110. In this way, objects within each storage volume 142 are more likely to fall into bed 110 as opposed to outside of truck 100. For example, in some instances, objects within each storage volume 142 may (e.g., by virtue of forces during travel of the pickup truck 100) come to lean against the corresponding door 140 such that when door 140 is intentionally opened (and the pickup truck 100 is parked) the objects will tend to fall out. Additionally, each door 140 may open unintentionally, during travel of the pickup truck 100 or as the pickup truck 100 is parked. For instance, each door 140 may not have been closed fully (or properly) or the corresponding lockable door handle assembly 128 may fail. This shorter fall may prevent damage to the objects. Additionally, by falling into the bed 110, as opposed to the ground, the objects may be kept cleaner. Further, the object may be prevented from falling into areas where the objects may become a hazard or collide with other objects outside of the pickup truck 100.

It will be noted that in some examples, the doors 140, instead of being swingably mounted to, may instead be in the form of roll-up doors. The roll-up door design provides the same benefits as described above with regard to swingable door 140 and also may not be, even when in an opened state, within the air space corresponding to the bed volume 118. The door handle assemblies 128 and moveable coupling mechanisms 130 may also vary as necessary with the roll-up door design.

As can further be seen, a respective rain guard 134 (or a fluid guard) is coupled (e.g., welded) to frame assembly 122 above each storage cabinet 126 (e.g., above each door 140 and each storage volume 142), span a width of each storage cabinet 126 (e.g., a width of each door 140 and a width of each storage volume 142), and act essentially as an awning or a soffit to direct rain (or other fluids) away form storage cabinet 126. Thus, rain guards 134 help to protect the interior of storage cabinets 126 (and objects therein) from damage or contamination from water (and other fluids). Alternatively, or additionally, dual-purpose storage assembly 120 could include a gasket for each storage cabinet 126 (e.g., coupled to the corresponding door 140 or coupled to a corresponding portion of frame assembly 122 and a corresponding portion of frame structure 135, or both) to seal the corresponding storage volume 142.

Cross-member section 132 is disposed between storage cabinets 126 and provides for visibility (light is allowed to pass through cross-member section 132 and to rear window 108). While cross member section 132 is shown as having a plurality of cross-members 134 in the form of horizontal bars, in other examples, cross-member section 132 could have more or less cross-members 134 that can be of various other forms or various other directionalities, or both. One such example is a singular cross member 134 in the form of grating. Each cross-member 134 covers a respective portion of rear window 106. Additionally, cross-members 134 are spaced apart (from themselves and from storage cabinets 126) such that objects of a certain size are restricted from travelling between them and to rear window 108. Additionally, it can be seen that cross-member section 132 (by virtue of the spacing of cross-members 134) allows illumination generated by light assembly 106 to reach and thus illuminate bed 110. The illumination assists with visibility of the bed 110, and objects therein, particularly in low ambient light settings (e.g., nighttime, cloudy days, when pickup truck 100 parked in a shaded area, etc.). The light assembly 106 can include brake light(s) and reverse light(s), as well, in some other examples, other forms of lights. In some examples, dual-purpose storage assembly 120, itself, can include a light assembly that is coupleable to and configured to be powered by pickup truck 100 to provide illumination for the bed 110. Additionally, in the illustrated example of cross-member section 132, the spacing between cross-members 134 is sufficient to allow a human hand to pass through thereby providing access for a human within cab 102 through cross-member section 132 and into bed 110 (or access for a human within bed 110 through cross-member section 132 and into cab 102). As previously discussed, the rear window 108 may have at least a portion that is openable, thus, allowing a human hand to extend into and out of cab 102.

It will also be noted, as can be seen in FIGS. 1-4, that storage cabinet 126-1 covers a first portion of rear window 108 and storage cabinet 126-2 covers a second portion of rear window 108. Additionally, cross-member section 132 extends across a third portion of rear window 108. Each cross-member 134 of cross-member section 132, covers a respective sub-portion of the third portion of the rear window 108.

Additionally, it will be noted that the arrangement of dual-purpose storage assembly 120 allows for the use of a full bed cover (e.g., a full tonneau cover) that covers the entirety of the bed volume 118. This because dual-purpose storage assembly 120 is not disposed within the bed volume 118, mounts to the rails of the bed 110, and is not within the airspace corresponding to the bed volume 118. Storage boxes disposed within the bed volume, within the airspace corresponding to the bed volume, or mounted to the bed in different ways can prevent the use of a full bed cover.

Figure 5A:
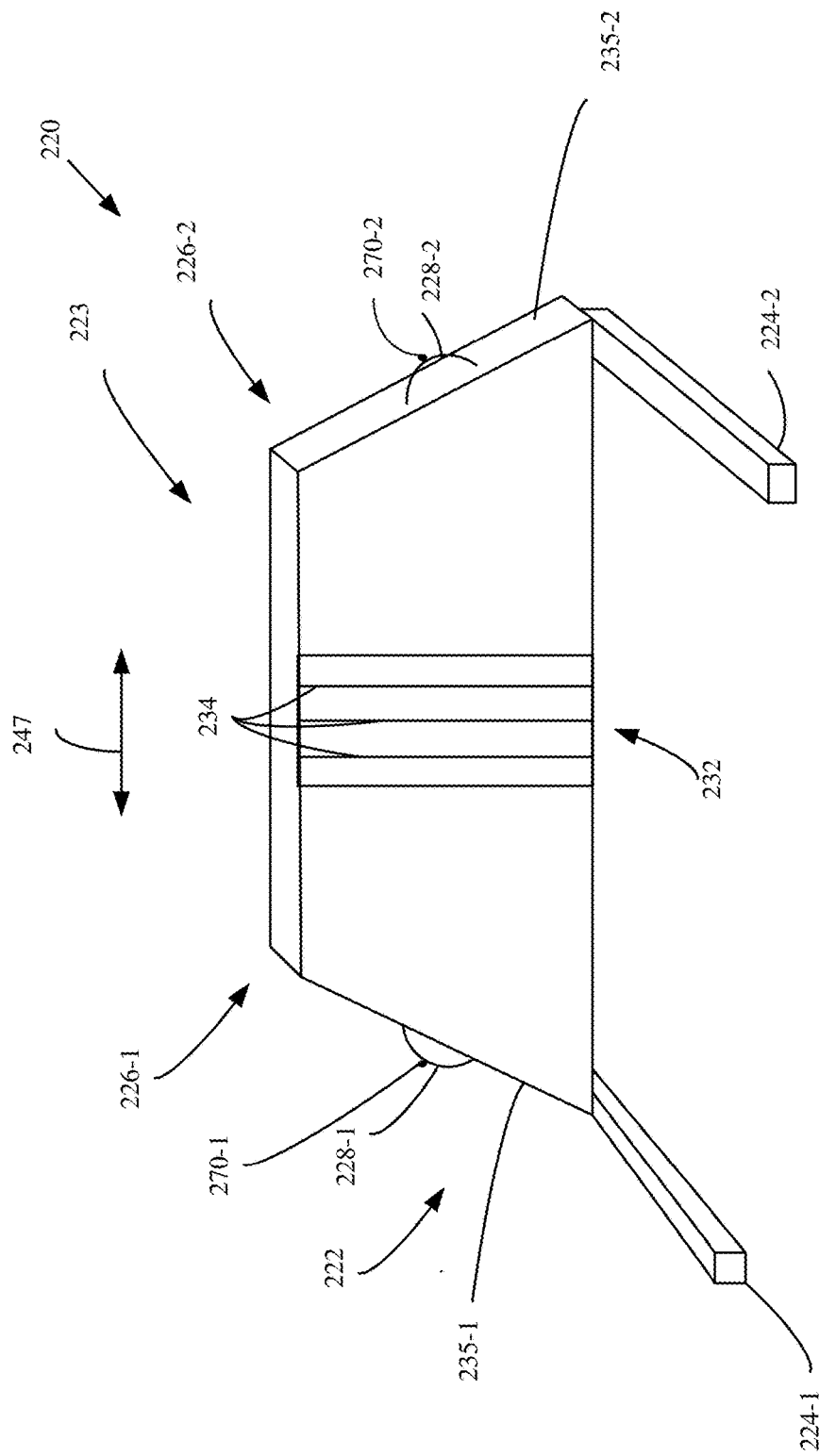
FIG. 5A is a perspective view of an example dual-purpose storage assembly.
Figure 5B:
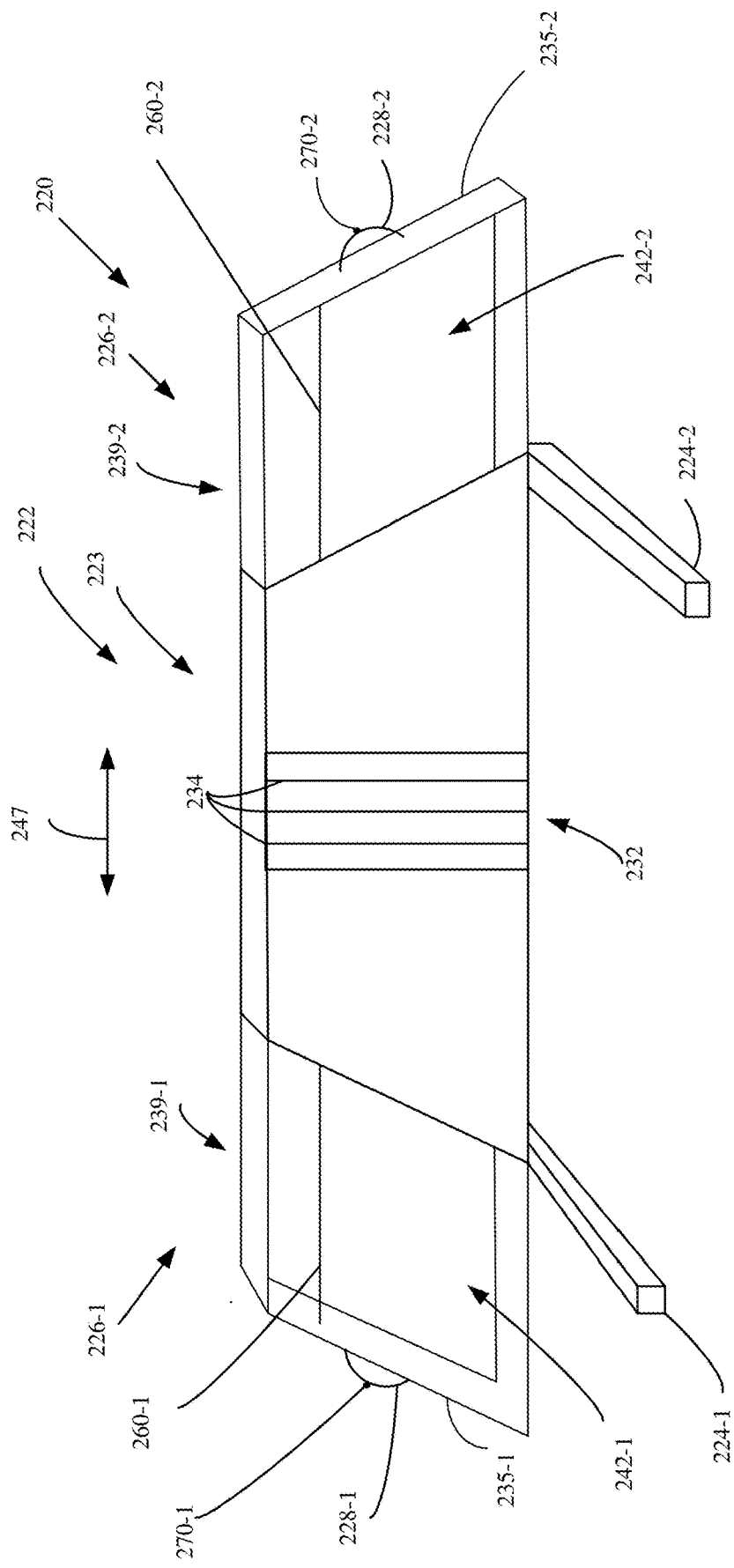
FIG. 5B is a perspective view of an example dual-purpose storage assembly.

FIGS. 5A-B are perspective views showing one example of a dual-purpose storage assembly 220. Dual-purpose storage assembly 220 can be coupled to a pickup truck, such as pickup truck 100, such that dual-purpose storage assembly 220 is wholly outside of, and thus, does not take up space of the bed volume (e.g., 118) of the bed (e.g., 110) of the pickup truck (e.g., 100). Dual-purpose storage assembly 220 includes frame assembly 222, storage cabinets (or storage cabinet assemblies) 226 (illustratively shown as 226-1 and 226-2), and cross member section 232. Frame assembly 222, itself, includes main frame structure 223 and feet 224 (illustratively shown as 224-1 and 224-2). Storage cabinets 226 each include a frame structure 235 (illustratively shown as 235-1 and 235-2), a lockable handle assembly 228 (illustratively shown as 228-1 and 228-2), a storage volume 242 (illustratively shown as 242-1 and 242-2), a drawer 239 (illustratively shown as 239-1 and 239-2), and one or more storage accessories 260 (illustratively shown as 260-1 and 260-2). Cross-member section 232, itself, includes one or more cross-members 234.

Dual-purpose storage assembly 220 couples to a pickup truck (e.g., 100) in the same way that dual-purpose storage assembly couples to a pickup truck. That is, each foot 224 mounts on a corresponding side-rail top (e.g., 116) and includes one or more apertures that are configured to receive a fastening mechanism (e.g., 150). A bolt of each fastening mechanism extends through a corresponding aperture of a corresponding foot 224 and through a corresponding aperture of a corresponding side rail (e.g., 114) that is aligned with the corresponding aperture of the corresponding foot 224. A nut (not shown) may be secured to a threaded end of each bolt to fastenably and removeably couple dual-purpose storage assembly 220 to a pickup truck (e.g., 100). Other forms of fastening mechanisms are contemplated herein.

As with dual-purpose storage assembly 120, each frame structure 235 of each storage cabinet 226 is coupled to main frame structure 223. However, frame structure 235 of each storage cabinet 226 is moveably (e.g., slidably) coupled to main frame structure 223. Each frame structure 235 forms a drawer 239 that includes a storage volume 242. Thus, each drawer 239 is slidably coupled to main frame structure 223 and can be moved into and out of main frame structure 223, in the directions indicated by arrow 247, to move between a storage position (shown in FIG. 5A) and a fully deployed position (shown in FIG. 5B). It will be understood that each drawer can move to a plurality of different positions between the storage position and the fully deployed position. A user may move a drawer 239 from the storage position to a deployed position in order to access the storage volume 242, such as when the user is standing outside of the pickup truck. For example, in a deployed position, at least a portion of drawer 239 (and at least a portion of storage volume 242) is outside of a perimeter of the bed (e.g., 110) of the pickup truck (e.g., 100). As illustrated in FIG. 5, each storage cabinet 226 includes a handle assembly 229 (illustratively shown as 229-1 and 229-2) that provides a greppable surface to assist a user in moving the corresponding drawer 239. Each handle assembly 229 includes an engagement mechanism 270 (illustratively shown as 270-1 and 270-2), illustratively shown as a button, that allows for latching and unlatching of the corresponding drawer 239. In other examples, each handle assembly 229 could instead be a lever that itself allows for latching and unlatching of the corresponding drawer 239. Each handle assembly 229 can also include a lock. It will be understood that element(s) (e.g., wheels, track, etc.) could be placed between each frame structure 235 and main frame structure 223 to assist in movement of drawers 239.

Each storage volume 242 provides for storage of various objects, such as tools. Each lockable door handle assembly 228 provides for fastenable and lockable closing of its corresponding drawer 239 to provide security of objects within the corresponding storage volume 242. As shown, each drawer 239 can include one or more storage accessories 260 that provide surfaces upon which object(s) (or portion(s) thereof) can rest to be stored. Storage accessories 260 thus provide for organization and can assist in keeping objects in place while stored, particularly as the storage cabinets 226 are moved, such as during travel of the pickup truck to which the storage cabinets 226 are coupled. In the illustrated example, storage accessories 260 are shown as rods from which objects can be hung, however, in other examples, storage cabinets can include, alternatively, or additionally, other types of storage accessories such as hook, shelves, baskets, etc. Additionally, while in the illustrated example it is shown that each storage cabinet 226 only includes one storage accessory 260, it will be understood that in other examples each storage cabinet 226 can include a plurality of storage accessories 260, which could comprise a plurality of the same type of storage accessories 260 or a plurality of storage accessories 260 of two or more types.

As with dual-purpose storage assembly 120, dual-purpose storage assembly 220 is of an arrangement and dimensions (e.g., depth) such that dual-purpose storage assembly 220 is not disposed within bed volume (e.g., 118) and also, at least when in in a closed state (i.e., when the drawers 239 are closed such as shown in FIG. 5A), is not disposed in the air space corresponding to the bed volume 118, though, storage assembly 220, is also not, even when in the open state (i.e., when the drawers are opened such as shown in FIG. 5B), disposed in the air space corresponding to the bed volume 118. Additionally, the storage volume 242 of each storage cabinet 226, at least when the corresponding storage cabinet 226 is in the closed state (shown in FIG. 5A), is not disposed in the air space corresponding to the most proximate side rail (e.g., 114).

Cross-member section 232 is similar to cross-member section 132 and includes cross-members 234 that are similar to cross-members 134. It will be noted, cross-member section 232 and cross-members 234 can vary as previously described with reference to cross-member section 132 and cross-members 134.

Additionally, it will be noted that dual-purpose storage assembly 220 can include a light assembly previously discussed with regard to dual-purpose storage assembly 120.

Additionally, as with dual-purpose storage assembly 132, it will be noted that storage cabinet 226-1, a covers a first portion of the rear window (e.g., 108) and storage cabinet 226-2 covers a second portion of rear window. Additionally, cross-member section 232 extends across a third portion of the rear window. Each cross-member 234 of cross-member section 232, covers a respective sub-portion of the third portion of the rear window.

As with dual-purpose storage assembly 120, it will be noted that the arrangement of dual-purpose storage assembly 220 allows for the use of a full bed cover (e.g., a full tonneau cover) that covers the entirety of the bed volume 118. This is because dual-purpose storage assembly 220 is not disposed within the bed volume 118, mounts to the rails of the bed 110, and is not within the airspace corresponding to the bed volume 118. Storage boxes disposed within the bed volume, within the airspace corresponding to the bed volume, or mounted to the bed in different ways can prevent the use of a full bed cover.

Although the present invention has been described with reference to preferred embodiments, workers skilled in the art will recognize that changes may be made in form and detail without departing from the spirit and scope of the invention.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. A dual-purpose storage assembly, the dual-purpose storage assembly coupleable to a pickup truck having a bed, the bed having a floor with a bed floor width, a first side rail having a first side rail top defining a first side rail height, and a second side rail having a second side rail top defining a second side rail height, the bed floor width, the first side rail height, and the second side rail height defining a bed volume, the pickup truck also having a cab, the cab including a rear window, the dual-purpose storage assembly comprising:

a frame assembly comprising:

a main frame configured to extend across a width of the bed;
a first foot coupled to and extending from the main frame and configured to be mounted to the first side rail top; and
a second foot coupled to an extending from the main frame and configured to be mounted to the second side rail top;
a first storage cabinet assembly configured to extend across a first portion of the rear window, the first storage cabinet assembly comprising:
a first storage cabinet frame coupled to the main frame and defining a first storage volume; and
a first moveable member moveable between a closed position and an opened position;
a second storage cabinet assembly configured to extend across a second portion of the rear window, the second storage cabinet assembly comprising:
a second storage cabinet frame coupled to the main frame and defining a second storage volume; and
a second moveably member movable between a closed position and an opened position; and
a cross-member section disposed between the first storage cabinet assembly and the second storage cabinet assembly and configured to extend across a third portion of the rear window, the cross-member section comprising:
a first cross-member extending along a dimension of the cross-member section and configured to extend across a fourth portion of the rear window, the fourth portion of the rear window within an area corresponding to the third portion of the rear window; and
a second cross-member extending along a dimension of the cross-member section and configured to extend across a fifth portion of the rear window, the fifth portion different than the fourth portion and within the area corresponding to the third portion of the rear window.

2. The dual-purpose storage assembly of claim 1, wherein the dual-purpose storage assembly, when coupled to the pickup truck, is configured to be disposed wholly outside of the bed volume.

3. The dual-purpose storage assembly of claim 1, wherein the dual-purpose storage assembly, when coupled to the pickup truck and when the first moveable member is in the closed position and when the second moveable member is in the closed position, is configured to be disposed wholly outside of the bed volume and wholly outside of an air space corresponding to the bed volume.

4. The dual-purpose storage assembly of claim 1, wherein the first storage cabinet frame is moveably coupled to the main frame such that the first storage cabinet assembly is moveable, along the main frame, between a storage position and a deployed position.

5. The dual-purpose storage assembly of claim 4, wherein the second storage cabinet frame is moveably coupled to the main frame such that the second storage cabinet assembly is moveable, along the main frame, between a storage position and a deployed position.

6. The dual-purpose storage assembly of claim 1, wherein the first moveable member comprises a first door moveably coupled to the first storage cabinet frame and the second moveable member comprises a second door moveably coupled to the second storage cabinet frame.

7. The dual-purpose storage assembly of claim 1, wherein the first moveable member comprises a first drawer that includes the first storage cabinet frame and is moveably coupled to the main frame and the second moveable member comprises a second drawer that includes the second storage cabinet frame and is moveably coupled to the main frame.

8. The dual-purpose storage assembly of claim 1, wherein the first storage cabinet assembly further comprises a first storage accessory that includes a surface configured to engage at least a portion of a first object to be stored in the first storage volume and the second storage cabinet further comprises a second storage accessory that includes a surface configured to engage at least a portion of a second object to be stored in second storage volume.

9. The dual-purpose storage assembly of claim 1, wherein the first cross-member and the second cross-member are spaced apart such that the cross-member section is configured to allow light to pass through to the rear window and to allow light, generated by a light assembly mounted to the cab, to pass through to the bed.

10. The dual-purpose storage assembly of claim 6, wherein the first door is configured to, when in the opened position, extend into an air space corresponding to the bed volume and over the bed and wherein the second door is configured to, when in the opened position, extend into the air space corresponding to the bed volume and over the bed.

11. The dual-purpose storage assembly of claim 1, wherein the first storage volume is configured to, when the dual-purpose storage assembly is coupled to the pickup truck and at least when in a closed position, be disposed wholly outside of an air space corresponding to the first side rail and wherein the second storage volume is configured to, when the dual-purpose storage assembly is coupled to the pickup truck and at least when in a closed position, be disposed wholly outside of an air space corresponding to the second side rail.

12. The dual-purpose storage assembly of claim 1 and further comprising:
a first fluid guard coupled to the frame assembly and disposed above the first storage volume, the first fluid guard configured to direct fluid away from the first storage volume; and
a second fluid guard coupled to the frame assembly and disposed above the second storage volume, the second fluid guard configured to direct fluid away from the second storage volume.

13. A pickup truck comprising:
a cab comprising:
a rear window;
a bed comprising:
a bed floor having a bed floor width;
a first side rail having a first side rail top and a first side rail height; and
a second side rail having a second side rail top and a second side rail height, wherein the bed floor width, the first side rail height, and the second side rail height define a bed volume, and
a dual-purpose storage assembly comprising:
a frame assembly comprising:
a main frame that extends across a width of the bed;
a first foot coupled to and extending from the main frame and mounted to the first side rail top; and
a second foot coupled to and extending from the main frame and mounted to the second side rail top;
a first storage cabinet assembly extending across a first portion of the rear window, the first storage cabinet assembly comprising:
a first storage cabinet frame coupled to the main frame and defining a first storage volume; and a first moveable member moveable between a closed position and an opened position;

a second storage cabinet assembly extending across a second portion of the rear window, the second storage cabinet assembly comprising:
a second storage cabinet frame coupled to the main frame and defining a second storage volume; and
a second moveable member movable between a closed position and an opened position; and a cross-member section, disposed between the first storage cabinet assembly and the second storage cabinet assembly and extending across a third portion of the rear window, the cross-member section comprising:
a first cross-member extending along a dimension of the cross-member section and extending across a fourth portion of the rear window, the fourth portion of the rear window within an area corresponding to the third portion of the rear window; and
a second cross-member extending along a dimension of the cross-member section and extending across a fifth portion of the rear window, the fifth portion different than the fourth portion and within the area corresponding to the third portion of the rear window.

14. The dual-purpose storage assembly of claim 13, wherein the dual-purpose storage assembly is disposed wholly outside of the bed volume.

15. The dual-purpose storage assembly of claim 14, wherein the dual-purpose storage assembly, at least when the first moveable member is in the closed position and at least when the second moveable member is in the closed position, is disposed wholly outside of an air space corresponding to the bed volume.

16. The dual-purpose storage assembly of claim 13, wherein the first storage cabinet frame is moveably coupled to the main frame such that the first storage cabinet assembly is moveable, along the main frame, between a storage position and a deployed position and wherein the second storage cabinet frame is moveably coupled to the main frame such that the second storage cabinet assembly is moveable, along the main frame, between a storage position and a deployed position.

17. The dual-purpose storage assembly of claim 13, wherein the first moveable member, when in the opened position, extends in an air space corresponding to the bed volume and over the bed and wherein the second moveable member, when in the opened position, extends in the air space corresponding to the bed volume and over the bed.

18. The dual-purpose storage assembly of claim 13, wherein the first storage volume, at least when the first moveable member is in the closed position, is wholly outside of an air space corresponding to the first side rail and wherein the second storage volume, at least when the second moveable member is in the closed position, is wholly outside of an air space corresponding to the second side rail.

19. The dual-purpose storage assembly of claim 13 and further comprising:
a first fluid guard coupled to the frame assembly and disposed above the first storage volume; and
a second fluid guard coupled to the frame assembly and disposed above the second storage volume.

20. A dual-purpose storage assembly, the dual-purpose storage assembly coupleable to a pickup truck having a bed, the bed having a floor with a bed floor width, a first side rail having a first side rail top defining a first side rail height, and a second side rail having a second side rail top defining a second side rail height, the bed floor width, the first side rail height, and the second side rail height defining a bed volume, the pickup truck also having a cab, the cab including a rear window, the dual-purpose storage assembly comprising:
a frame assembly comprising:
a main frame configured to extend across a width of the bed;
a first foot coupled to and extending from the main frame and configured to be mounted to the first side rail top; and
a second foot coupled to an extending from the main frame and configured to be mounted to the second side rail top;

a first storage cabinet assembly configured to extend across a first portion of the rear window, the first storage cabinet assembly comprising:
a first storage cabinet frame coupled to the main frame and defining a first storage volume; and
a first moveable member moveable between a closed position and an opened position;

a second storage cabinet assembly configured to extend across a second portion of the rear window, the second storage cabinet assembly comprising:
a second storage cabinet frame coupled to the main frame and defining a second storage volume; and
a second moveable movable between a closed position and an opened position; and a cross-member section configured to extend across a third portion of the rear window, the cross-member section comprising:
a cross-member extending along a dimension of the cross-member section and configured to extend across a fourth portion of the rear window, the fourth portion of the rear window within an area corresponding to the third portion of the rear window.

* * * * *